(12) United States Patent
Hickling

(10) Patent No.: US 7,751,281 B1
(45) Date of Patent: Jul. 6, 2010

(54) DETECTION OF BURED OBJECTS USING AN ARRAY OF NON-CONTACT ULTRASONIC VIBROMETERS

(76) Inventor: Robert Hickling, 8306 Huntington Rd., Huntington Woods, MI (US) 48070-1643

( * ) Notice: Subject to any disclaimer, the term of this patent is extended or adjusted under 35 U.S.C. 154(b) by 0 days.

(21) Appl. No.: 12/589,652

(22) Filed: Oct. 27, 2009

(51) Int. Cl.
*G01S 3/80* (2006.01)
(52) U.S. Cl. ...................................................... 367/88
(58) Field of Classification Search ................... 367/99, 367/88, 92; 73/602, 628; 89/1.13
See application file for complete search history.

(56) References Cited

U.S. PATENT DOCUMENTS

| | | | |
|---|---|---|---|
| 5,357,063 | A | 10/1994 | House |
| 6,081,481 | A | 6/2000 | Sabatier |
| 6,862,252 | B1 | 3/2005 | Hickling |
| 7,694,567 | B2 * | 4/2010 | Haupt et al. ................... 73/627 |

OTHER PUBLICATIONS

R. Hickling and S. P. Marin, "The use of ultrasonics for gauging and proximity sensing in air" J. Acoust. Soc. Amer., 79(4), 1151-1160, 1986.

D. Donskoy et al, "Nonlinear seismo-acoustic landmine detection and discrimination", J. Acoust. Soc. Amer., 111(6), 2705-2714, 2002.

\* cited by examiner

*Primary Examiner*—Dan Pihulic

(57) ABSTRACT

Acoustic apparatus and method for detecting and identifying near-surface buried objects using a non-contact array of ultrasonic vibrometers (200) each vibrometer having a focused beam in air (400) pointing vertically at the ground. Also there is a low-frequency loudspeaker (60). Both are connected to a digital signal processor (40). The loudspeaker emits continuous sound that penetrates the ground and generates echoes from a buried object, creating seismic vibrations (350) at the surface (150). The vibrometers emit pulses of focused ultrasound with a known depth of field (650) and receive echo pulses (770) from the seismic vibrations. The pulses occur at a much faster rate than the frequency of the seismic vibrations, typically a few thousand times faster, thus permitting the processor to compute the motion and frequency content of the seismic vibrations. This data from the array determines the shape and frequency response of near-surface buried objects which are shown on a display device. The apparatus is practical and inexpensive. A movable means of scanning with the apparatus can cover the ground one section of area at a time.

9 Claims, 4 Drawing Sheets

DETECTION OF BURED OBJECTS USING AN ARRAY OF NON-CONTACT ULTRASONIC VIBROMETERS

TECHNICAL FIELD

This invention relates to an array of non-contact, ultrasonic vibrometers close to the ground. The vibrometers have a focused beam in air with a standoff distance of a few inches. Continuous sound from a low-frequency speaker penetrates the ground and is reflected by a near-surface buried object. Echoes from the buried object cause a seismic motion of the ground surface which is measured by the array. A purpose of the invention is to detect landmines.

BACKGROUND OF THE INVENTION

A non-contact, ultrasonic vibrometer can include an off-the-shelf, pulse-echo, focused sensor, similar to those used in medical ultrasonics and non-destructive testing, but adapted for use in air. Typically the focused beam has a stand-off distance of a few inches. It is known that a beam can measure the distance to a surface quite accurately, as described in
 1. R. Hickling and S. P. Marin, "The use of ultrasonics for gauging and proximity sensing in air", J. Acoust. Soc. Amer., 79(4), 1151-1160, 1986.

A previous acoustic-seismic method is described in:
 2. J. M. Sabatier and K. E. Gilbert, "Method of detecting buried objects by measuring seismic vibrations by coupling with a remote source of sound", U.S. Pat. No. 6,081,481, Jun. 27, 2000.

in which continuous sound penetrates the ground, returning echoes from a buried object. A laser-Doppler vibrometer (LDV) scans the surface of the ground to detect seismic vibrations at the surface resulting from the echoes. The LDV emits a laser beam which detects the Doppler shift of the reflected light due to the motion of the surface. Some success has been achieved with this method, as indicated in:
 3. D. Donskoy et al, "Nonlinear seismo-acoustic landmine detection and discrimination", J. Acoust. Soc. Amer., 111(6), 2705-2714, 2002.

However there appear to be some disadvantages. An LDV is expensive and requires trained personnel to operate it. Scanning is slow with a single LDV. An array of LDVs would be too complex and costly. An LDV has to be carefully aligned with the slope of the ground. Also vibrational coupling between the speaker emitting continuous sound and the LDV can interfere with the LDV signals.

Other Acoustic Methods of Detecting Buried Objects

LDVs are not used in other acoustic methods. Instead microphones detect the echoes of sound pulses from a buried object, as the echoes emerge from the ground. Pulses are used in an attempt to separate incident from reflected sound. An example is
 4. L. J. House and D. B. Pape, "Method and Apparatus for Acoustic Energy Identification of Objects buried in Soil", U.S. Pat. No. 5,357,063, Oct. 18, 1994.

Another example is:
 5. R. Hickling, "Method and Apparatus for Acoustic Detection of Buried Objects", U.S. Pat. No. 6,862,252, Mar. 1, 2005.

The principal difficulty with these methods is making the pulses short enough to separate incident from reflected sound, within the scale of the structure used in the method.

SUMMARY OF THE INVENTION

The present invention includes and utilizes an acoustic apparatus for detecting and identifying near-surface buried objects. It includes a non-contact array of ultrasonic, pulse-echo vibrometers pointing vertically at the ground, emitting pulses and receiving echoes from the surface. The pulses include focused ultrasound having a known range and depth of field. Depth of field is the distance over which the ultrasonic beam remains focused. Also included is a loudspeaker emitting continuous low-frequency sound, which penetrates the ground and generates echoes from a buried object. The echoes cause seismic vibrations of the ground surface above the object, occurring within the range and depth of field of the vibrometer. The array of vibrometers and the loudspeaker are controlled by a digital signal processor through a multi-channel analog-to-digital convertor and data-acquisition system.

The processor drives the vibrometers with a steady stream of pulses which have a repetition rate much higher than the frequency of the seismic vibrations. Typically the repletion rate is about five thousand times greater than a cycle of the seismic vibration. Hence there is a correspondingly very short time interval between the outgoing pulses and the return of the echoes from the ground surface that can be used to follow the seismic motion. No significant seismic vibrations occur if there is not a buried object. The motion of the seismic vibrations is then computed by the processor. Also the processor uses fast Fourier transforms (FFTs) to determine the frequency content of the vibrations. From the array of vibrometers, the processor determines the location and shape of a buried object and its frequency response. This information is displayed using a suitable output device such as a monitor screen.

A movable means of scanning with the array of vibrometers, loudspeaker and associated instrumentation can be used to cover the ground surface, one section of area at a time. It can include a frame with a pair of wheels where the frame is balanced on either side of an axle joining the wheels. On one side of the wheels is a box containing the instrumentation and weights, with a mechanical jack for adjusting balance. On the other side of the wheels are the array of focused ultrasonic vibrometers and the loudspeaker. Cables connecting the array and loudspeaker to the instrumentation lie along the frame. The mechanical jack can adjust the height of the array to place the surface of the ground within the depth of field of the vibrometers. To move to another location the jack is adjusted so that the weights in the box raise the array well clear of the ground before moving.

DETAILED DESCRIPTION OF THE PREFERRED EMBODIMENT

Figure 1:
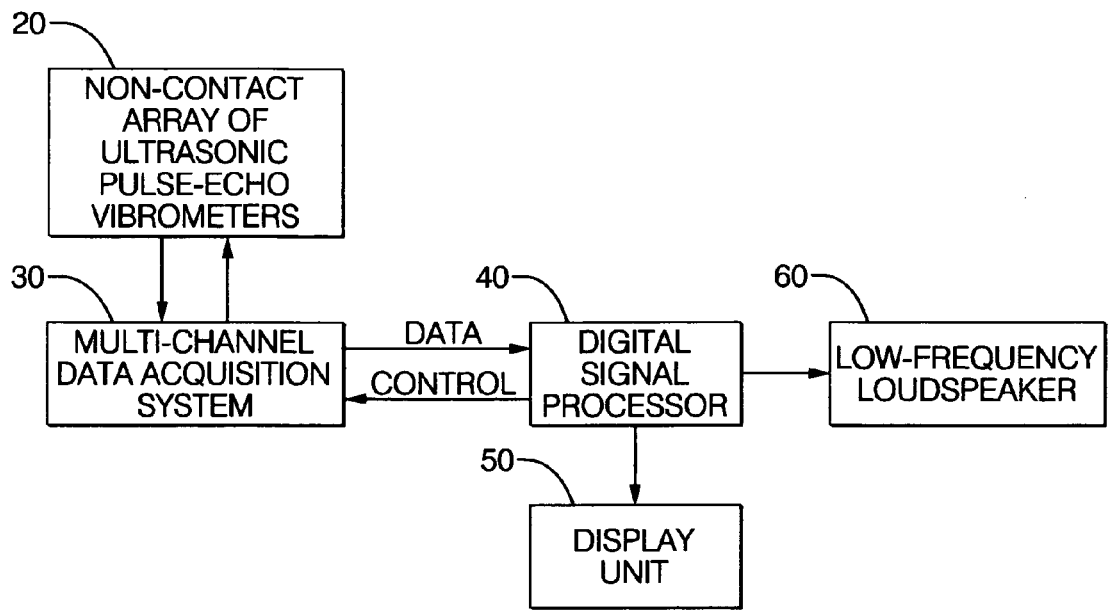
FIG. 1 is a block diagram illustrating the acoustic-seismic apparatus for detecting buried objects using a non-contact array of ultrasonic, pulse-echo vibrometers.

FIG. 1 is a block diagram illustrating the acoustic-seismic method of the present invention. Block 20 represents a non-contact array of ultrasonic, pulse-echo vibrometers. Block 60 represents a loudspeaker that emits continuous low-frequency sound, typically at about 200 Hz, penetrating the ground and generating echoes from a near-surface buried object that create seismic vibrations at the surface. Block 30 represents a multi-channel data-acquisition system for analog to digital conversion of the signals passing between the array and a digital signal represented by block 40. The processor controls the array and the loudspeaker. The processor drives the vibrometers with a rapid series of pulses which have a repetition rate much faster than the seismic frequency. Typically the repletion rate is about five thousand times faster than a cycle of the seismic vibration. Hence there is a correspondingly very short time interval between the outgoing pulses and the return of the echoes from the ground surface that can be used to follow the seismic motion. No significant seismic vibrations occur if there is not a buried object. The motion of the seismic vibrations is then computed by the processor. The processor also determines the frequency content of the seismic vibrations using fast Fourier transforms (FFTs). The results are displayed on a device 50 such as a monitor screen.

Figure 2:
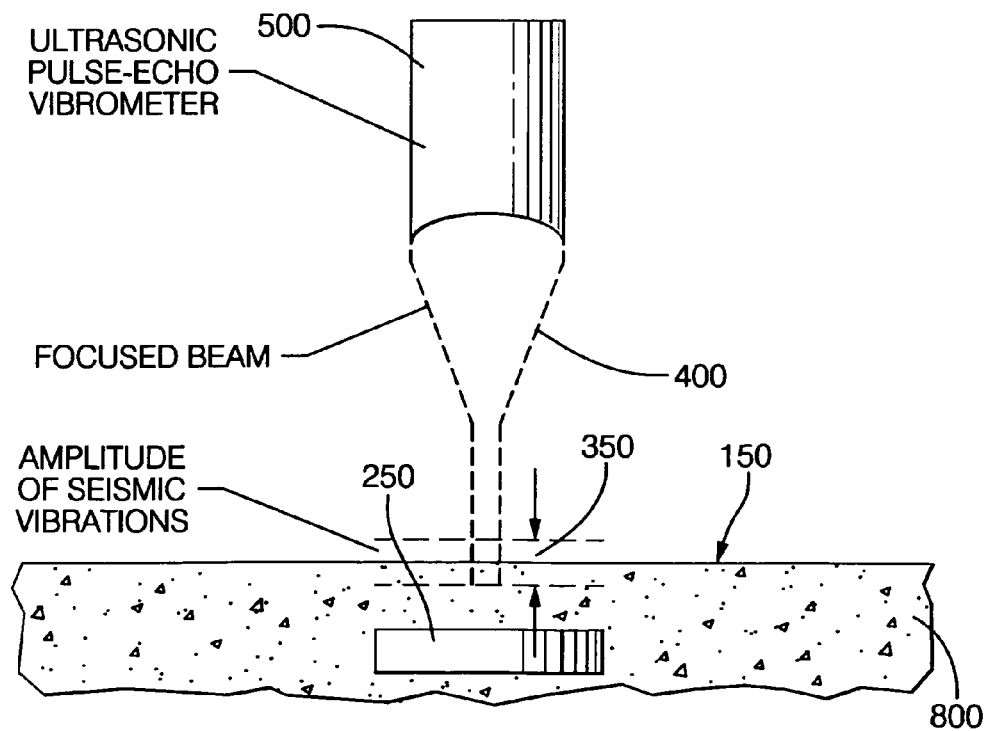
FIG. 2 shows the focused beam in air of an ultrasonic pulse-echo vibrometer detecting the seismic vibrations of the ground surface due to echoes from a near-surface buried object.

FIG. 2 is a schematic diagram illustrating a focused beam 400 emitted by an ultrasonic, pulse-echo vibrometer 500. The beam measures the motion 350 of the seismic vibration of the ground surface 150 caused by echoes from a buried object 250, where these echoes are generated by sound penetrating the ground 800 from the low-frequency loudspeaker 80. The mechanical properties of the buried object differ from those of the porous ground surrounding it. When the ground does not contain a buried object, there are no significant seismic vibrations.

Figure 3:
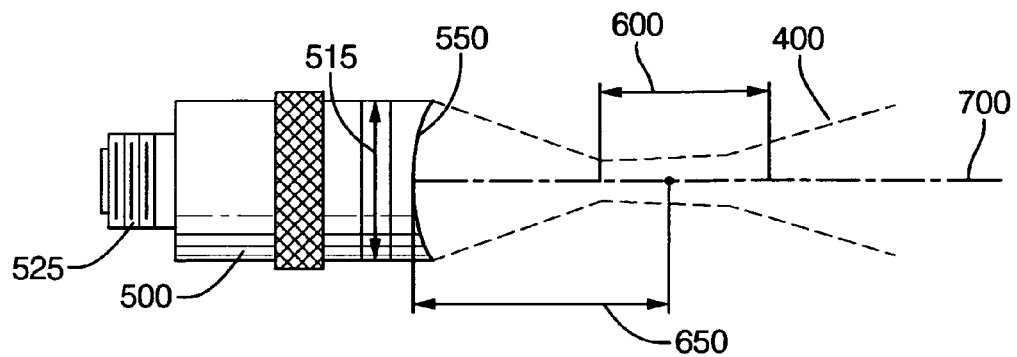
FIG. 3 shows the depth of field and the standoff distance of the focused ultrasonic beam.

FIG. 3 is a schematic drawing illustrating the detailed structure of the beam 400 formed by the pulse-echo vibrometer 500 in air. It shows the elongated focal region, or depth of field, 600, the stand-off distance 650 and the center line 700 of maximum amplitude. Depth of field and stand off distance are concepts familiar in photography. Depth of field is the length over which the beam remains focused. The driving element 550 of the vibrometer 500 is a section of a concave spherical surface. Transducers of this type are available from companies such as Olympus NDT. The depth of field 600 is about a third of the stand-off distance. The diameter 515 of the vibrometer can be about 25 mm or more with a proportionate stand-off distance 600, of about 75 mm and depth of field 650, of about 25 mm. At 1 MHz, absorption by the air medium limits the standoff distance to less than about 200 mm or about eight inches. The vibrometer 500 has an electrical connection 525 through which pass the outgoing ultrasonic pulses from the processor and the corresponding return echoes from the seismic vibrations to the processor.

Figure 4:
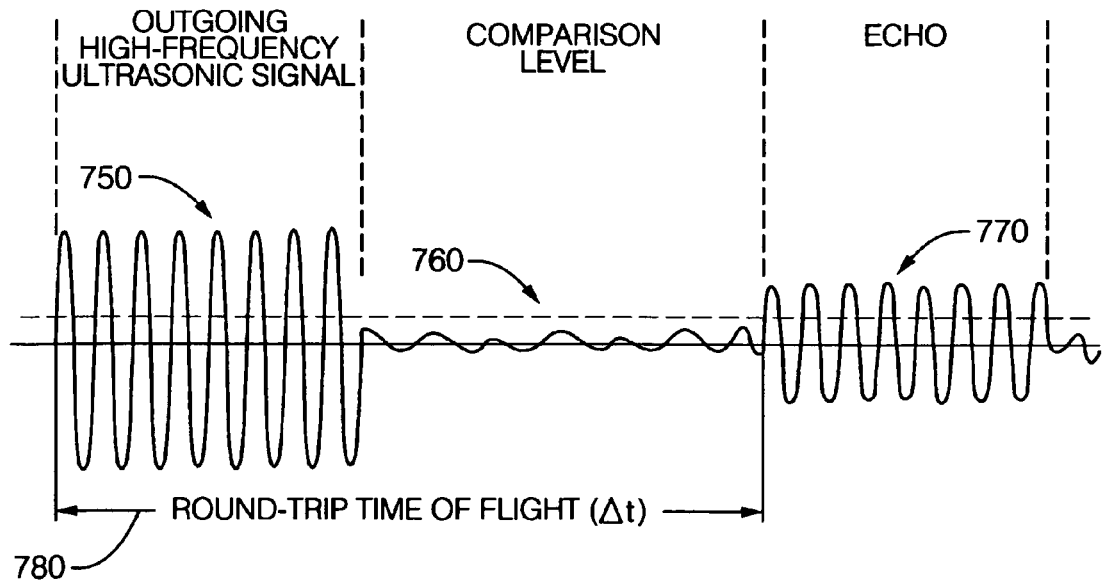
FIG. 4 shows an outgoing signal from the ultrasonic vibrometer and its echo from a vibrating surface, together with a comparison level above background noise.

FIG. 4 shows the outgoing ultrasonic pulse 750 and the return echo 770 from the seismic vibrations of the ground surface 150. Also shown is a steady-state background noise comparison level 760. The time of flight 780 between the outgoing pulse and the resulting echo measures the distance between the vibrometer and the vibrating surface. As was previously explained, the repetition rate of the outgoing ultrasonic pulses is much faster than the frequency of the seismic vibrations, typically a few thousand times. Thus it is possible for the ultrasonic vibrometer and processor to follow the seismic vibrations 350 and to provide a trace of the vibrations and its frequency content for the output device 50.

Figure 5:
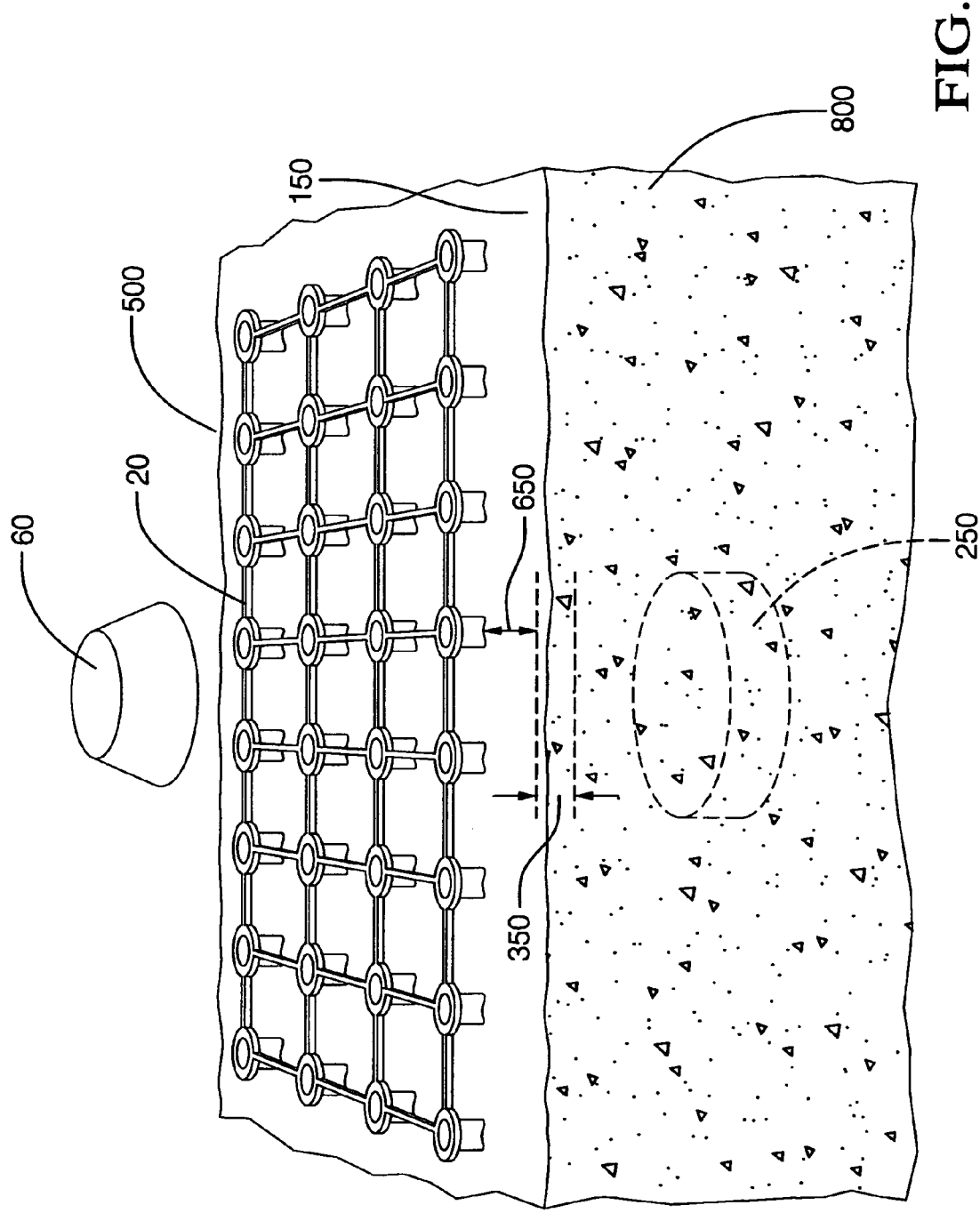
FIG. 5 shows a non-contact array of pulse-echo, ultrasonic vibrometers with a loudspeaker above the array that emits low-frequency continuous sound that penetrates the ground and returns echoes from a buried object, causing seismic vibrations at the ground surface.

FIG. 5 is a drawing showing an array 20 of ultrasonic vibrometers that are at a stand-off distance above the ground surface 150. The frame 20 of the array contains the cables linked to the processor. The low-frequency loudspeaker 60 is above the array, generating sound that penetrates the ground 800 and returns echoes from a near-surface buried object 250. The echoes cause seismic vibrations 350 at the ground surface 150.

Figure 6:
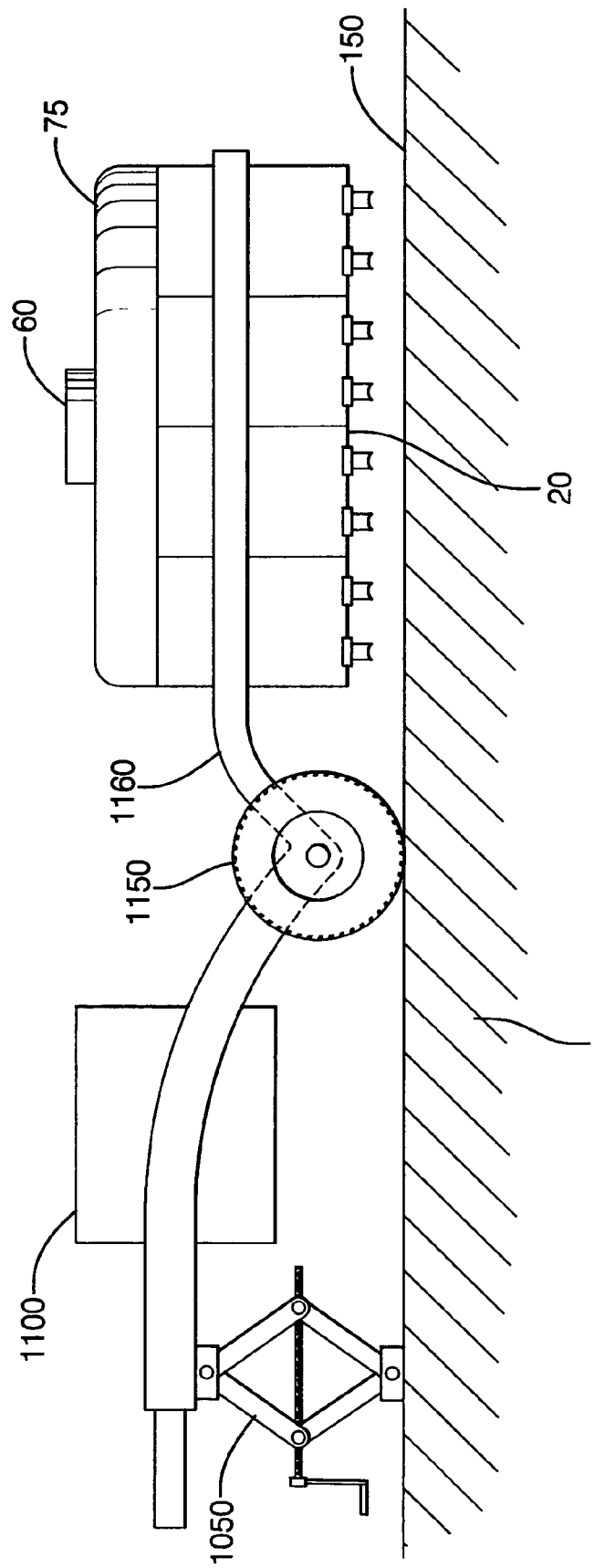
FIG. 6 shows a movable means of scanning the ground in search of buried objects using the non-contact array of pulse-echo ultrasonic vibrometers and loud speaker.

FIG. 6 shows a movable means of scanning using the non-contact array of ultrasonic vibrometers and low-frequency loudspeaker. This can cover the ground, one section of area at a time. It can have a supporting frame 1160 with a pair of wheels 1150. The frame is balanced on either side of the axle joining the wheels. On one side is a box 1100 containing the instrumentation and weights, together with a mechanical jack 1050 for adjusting the alignment of the frame 1160. On the other side are the non-contact array of vibrometers 20 and the low-frequency loudspeaker 60. Cables from the array and speaker pass over the frame 1160 to the instrumentation. The mechanical jack 1050 can adjust the height of the array 20 to place the surface of the ground within the depth of field of the vibrometers. The stand-off distance 650 of the array is controlled by a pivoting movement around the axle joining the pair of wheels 1150, using the mechanical jack 1050, and the weights in the container 1100. The system is moved to another location using the wheels 1150, after the mechanical jack has raised the array 20 clear of the ground surface using the weights in the container 1100. In this way a systematic search can be conducted for buried objects.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

I claim:

1. An acoustic apparatus for detecting and identifying buried objects comprising:
    a non-contact array of vibrometers pointed vertically at the ground, emitting pulses of focused ultrasound with a known depth of field and receiving echoes from the ground surface;
    a low-frequency loudspeaker, located above said array of non-contact vibrometers, emitting continuous sound for penetrating the porous structure of the ground and generating echoes from a buried object,
    said non-contact array of vibrometers connected to a multi-channel data acquisition system for conversion of signals from analog to digital form
    said multi-channel system connected to a digital signal processor;
    said processor connected to a device for displaying data;
    said processor controlling both said non-contact array of vibrometers and said low-frequency loudspeaker.

2. The invention as in claim 1 wherein said echoes from a buried object generate seismic vibrations at the surface of the ground that have the low frequency of the sound emitted by the loudspeaker.

3. The invention as in claim 1 wherein the ground surface is within said depth of field of the vibrometers in said non-contact array 4. The invention as in claim 1 wherein the vibrometers in said non-contact array emit pulses and receive echoes from the ground surface at a much faster rate, typically a few thousand times faster, than the frequency of said seismic vibrations, thus permitting the processor to compute the motion and the frequency content of the seismic vibrations and to show these results on said device for displaying data.

5. The invention as in claim 1 wherein a movable means of scanning with said acoustic apparatus for detecting and identifying buried objects is used to cover the ground surface, one section of area at a time.

6. An acoustic method for detecting and identifying buried objects comprising the steps of:

emitting pulses of focused ultrasound with a known depth of field from a non-contact array of vibrometers pointing vertically at the ground;

receiving echo signals from the ground surface by said non-contact array of vibrometers;

converting said echo signals from the ground surface from analog to digital form for analysis by a digital signal processor;

emitting continuous sound from a low-frequency loudspeaker for penetrating the porous structure of the ground and generating echoes from a buried object;

generating seismic vibrations at the ground surface by means of said echoes from a buried object;

controlling both said non-contact array of vibrometers and said low-frequency loudspeaker by means of said digital signal processor;

presenting results computed by said digital processor on a device for displaying data.

7. The method as defined in claim 6 wherein the ground surface is within said depth of field of the vibrometers in said non-contact array.

8. The method as defined in claim 6 wherein the vibrometers in said non-contact array emit pulses and receive echoes from the ground surface at a much faster rate, typically a few thousand times faster, than the frequency of said seismic vibrations, thus permitting the processor to compute the motion and frequency content of the seismic vibrations and to show these results on said device for displaying data.

9. The method as defined in claim 6 wherein a movable means of scanning the ground surface with said acoustic apparatus for detecting and identifying buried objects is used to cover the ground surface, one section of area at a time.

\* \* \* \* \*